United States Patent
Tsai et al.

(10) Patent No.: US 11,032,857 B2
(45) Date of Patent: Jun. 8, 2021

(54) APPARATUSES AND METHODS FOR SYNCHRONIZING STATES OF SEPARATE SUBSCRIBER IDENTITIES WITH NETWORK

(71) Applicant: MEDIATEK INC., Hsin-Chu (TW)

(72) Inventors: Chih-Yuan Tsai, Hsinchu (TW); Mohamed Abdelrazek El-Saidny, Dubai (AE); Yung-Chun Lin, Hsinchu (TW); Tzu-Ting Lo, Hsinchu (TW); Tsung-Ming Lee, Hsinchu (TW); Chun-Pin Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 76 days.

(21) Appl. No.: 16/413,899

(22) Filed: May 16, 2019

(65) Prior Publication Data
US 2019/0357275 A1    Nov. 21, 2019

Related U.S. Application Data

(60) Provisional application No. 62/672,613, filed on May 17, 2018.

(51) Int. Cl.
*H04W 76/10* (2018.01)
*H04W 8/18* (2009.01)
(Continued)

(52) U.S. Cl.
CPC .......... *H04W 76/10* (2018.02); *H04B 17/309* (2015.01); *H04L 1/0026* (2013.01);
(Continued)

(58) Field of Classification Search
CPC ....... H04W 76/10; H04W 8/18; H04W 76/30; H04W 24/10; H04W 76/27; H04W 36/30;
(Continued)

(56) References Cited

U.S. PATENT DOCUMENTS 9,826,570 B1 * 11/2017 Gupta ................. H04L 65/1073
10,057,800 B2    8/2018 Liao et al.
(Continued)

FOREIGN PATENT DOCUMENTS

EP    2733987 A1 *  5/2014 ............ H04W 60/00
EP    2302971 B1 * 10/2017 ............ H04W 48/16
(Continued)

*Primary Examiner* — Jay P Patel
(74) *Attorney, Agent, or Firm* — McClure, Qualey & Rodack, LLP

(57) ABSTRACT

A mobile communication device including a Radio Frequency (RF) device and a baseband processor is provided. The RF device performs wireless transmission and reception to and from one or more cells. The baseband processor uses a first subscriber identity to establish a connection with a serving cell via the RF device to perform a first communication procedure, and in response to completing the first communication procedure or the first communication procedure being interrupted by a second communication procedure associated with a second subscriber identity, uses the first subscriber identity to send a measurement report to the serving cell via the RF device. In particular, the measurement report indicates a reported signal quality of the serving cell is poor enough to release the connection.

18 Claims, 12 Drawing Sheets

(51) Int. Cl.

| | |
|---|---|
| *H04W 76/30* | (2018.01) |
| *H04W 24/10* | (2009.01) |
| *H04B 17/309* | (2015.01) |
| *H04W 76/27* | (2018.01) |
| *H04W 36/30* | (2009.01) |
| *H04W 36/00* | (2009.01) |
| *H04L 1/00* | (2006.01) |

(52) U.S. Cl.
CPC ............. *H04W 8/18* (2013.01); *H04W 24/10* (2013.01); *H04W 36/0016* (2013.01); *H04W 36/30* (2013.01); *H04W 76/27* (2018.02); *H04W 76/30* (2018.02)

(58) Field of Classification Search
CPC . H04W 36/0016; H04W 76/34; H04W 60/04; H04W 76/19; H04B 17/309; H04L 1/0026
See application file for complete search history.

(56) References Cited

U.S. PATENT DOCUMENTS

| | | | |
|---|---|---|---|
| 10,057,870 B2 * | 8/2018 | Dev | H04W 48/20 |
| 10,327,276 B2 * | 6/2019 | Muller | H04L 43/0864 |
| 2014/0220981 A1 * | 8/2014 | Jheng | H04W 36/0011 455/437 |
| 2015/0092746 A1 * | 4/2015 | Jang | H04W 24/08 370/331 |
| 2016/0249408 A1 * | 8/2016 | Thiruvenkatachari | H04W 76/38 |
| 2016/0360462 A1 * | 12/2016 | Chockalingam | H04W 36/30 |
| 2017/0019852 A1 * | 1/2017 | Yang | H04W 24/08 |
| 2017/0150545 A1 * | 5/2017 | Ramkumar | H04W 52/0212 |
| 2017/0289958 A1 * | 10/2017 | Dev | H04W 48/20 |
| 2018/0084601 A1 * | 3/2018 | Dhanapal | H04W 52/0212 |
| 2020/0067793 A1 * | 2/2020 | Dribinski | H04W 36/00837 |
| 2020/0280360 A1 * | 9/2020 | Bai | H04W 76/19 |
| 2020/0412432 A1 * | 12/2020 | Da Silva | H04B 7/0632 |
| 2020/0413316 A1 * | 12/2020 | Isaksson | H04W 36/00 |
| 2021/0037422 A1 * | 2/2021 | Kolding | H04W 28/10 |

FOREIGN PATENT DOCUMENTS

| | | | | |
|---|---|---|---|---|
| WO | WO-2013010463 A1 * | 1/2013 | ........ | H04W 36/0079 |
| WO | WO-2014000650 A1 * | 1/2014 | ............ | H04W 76/25 |
| WO | WO-2014012562 A1 * | 1/2014 | ............ | H04W 40/12 |
| WO | WO-2016065108 A1 * | 4/2016 | ............ | H04W 76/19 |
| WO | WO-2016200305 A1 * | 12/2016 | ........ | H04L 43/0864 |
| WO | WO-2017143609 A1 * | 8/2017 | ............ | H04W 76/38 |

* cited by examiner

APPARATUSES AND METHODS FOR SYNCHRONIZING STATES OF SEPARATE SUBSCRIBER IDENTITIES WITH NETWORK

CROSS REFERENCE TO RELATED APPLICATIONS

This Application claims priority of U.S. Provisional Application No. 62/672,613, filed on May 17, 2018, the entirety of which is incorporated by reference herein.

BACKGROUND OF THE APPLICATION

Field of the Application

The application generally relates to multi-Subscriber Identity Module (SIM) coordination, and more particularly, to apparatuses and methods for synchronizing states of separate subscriber identities with network.

Description of the Related Art

With growing demand for ubiquitous computing and networking, various cellular technologies have been developed, such as Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, 5G New Radio (NR) technology, and others.

Generally, a cellular phone (which may also be referred to as User Equipment (UE)) only supports one cellular technology and provides users with flexible mobile communications at all times via the supported cellular technology using a single subscriber identity card (which provides a single subscriber identity). However, to an increasing extent, more and more people find having an additional subscriber identity card (which provides an additional subscriber identity) to be a good way to reduce their mobile service charges (including voice and/or data services), or to separate personal and business phone calls. In order to alleviate the burden of carrying two cellular phones for two separate subscriber identity cards, so-called dual-card cellular phones have been developed, which generally support one or more cellular technologies using a Radio Frequency (RF) device for respective mobile services using an individual subscriber identity card. The dual-card design allows communication operations associated with different subscriber identities to be active simultaneously and allows calls to be made or received (on either subscriber identity) amid other mobile services.

FIG. 1 shows an exemplary scenario of communication operations associated with two subscriber identities in a conventional dual-card UE with an RF device. As shown in FIG. 1, at first, a Voice-over-LTE (VoLTE) call is made using the first subscriber identity (denoted as SIM1 in FIG. 1). When the VoLTE call ends, the network will usually wait for a period of time before sending a connection release command to the UE. During this period of time, the state of SIM1 should stay in the connected mode. However, when another subscriber identity (denoted as SIM2 in FIG. 1) initiates a Location Update (LU) procedure, the LU procedure associated with SIM2 will interrupt the communication operation associated with SIM1, causing a fraction of time (denoted with grey background in FIG. 1) in which the state of SIM1 becomes unsynchronized between the UE and the network. Consequently, any mobile-terminated (MT) call for SIM1 arrived during this fraction of time will be missed and this will inevitably result in bad user experience.

FIG. 2 shows another exemplary scenario of communication operations associated with two subscriber identities in a conventional dual-card UE with an RF device. As shown in FIG. 2, at first, SIM2 initiates a Tracking Area Update (TAU) procedure and the state of SIM2 switches from the idle mode to the connected mode. Subsequent to the TAU procedure, the UE receives a Data Radio Bearer (DRB) configuration command for SIM2 from the network. When the configuration of DRB ends, the network will usually wait for a period of time before sending a connection release command to the UE. During this period of time, the state of SIM2 should stay in the connected mode. However, when SIM1 initiates a TAU procedure, the TAU procedure associated with SIM1 will interrupt the communication operation associated with SIM2, causing a fraction of time (denoted with grey background in FIG. 2) in which the state of SIM2 becomes unsynchronized between the UE and the network. Consequently, any MT call for SIM2 arrived during this fraction of time will be missed and this will inevitably result in bad user experience.

BRIEF SUMMARY OF THE APPLICATION

In order to solve the aforementioned problems, the present application proposes to send a measurement report to the serving cell, when the communication procedure associated with either subscriber identity is completed or interrupted by the communication procedure associated with another subscriber identity. In particular, the measurement report indicates that the signal quality of the serving cell is poor enough (e.g., a value representing a worst signal quality may be filled in the measurement report), which may trigger the network to send a connection release command as soon as possible, thereby keeping the states of separate subscriber identities synchronized between the UE and the network.

In one aspect of the application, a mobile communication device comprising a Radio Frequency (RF) device and a baseband processor is provided. The RF device is configured to perform wireless transmission and reception to and from one or more cells. The baseband processor is configured to use a first subscriber identity to establish a connection with a serving cell via the RF device to perform a first communication procedure, and in response to completing the first communication procedure or the first communication procedure being interrupted by a second communication procedure associated with a second subscriber identity, use the first subscriber identity to send a measurement report to the serving cell via the RF device, wherein the measurement report indicates a reported signal quality of the serving cell is poor enough to release the connection.

In another aspect of the application, a method for synchronizing states of separate subscriber identities with network, executed by a mobile communication device comprising an RF device, is provided. The method comprises the steps of: using a first subscriber identity to establish a connection with a serving cell via the RF device to perform a first communication procedure; and in response to completing the first communication procedure or in response to the first communication procedure being interrupted by a second communication procedure associated with a second subscriber identity, using the first subscriber identity to send a measurement report to the serving cell via the RF device, wherein the measurement report indicates a reported signal quality of the serving cell is poor enough to release the connection.

Other aspects and features of the present application will become apparent to those with ordinarily skill in the art upon review of the following descriptions of specific embodiments of the mobile communication devices and methods for synchronizing states of separate subscriber identities with network.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 3:
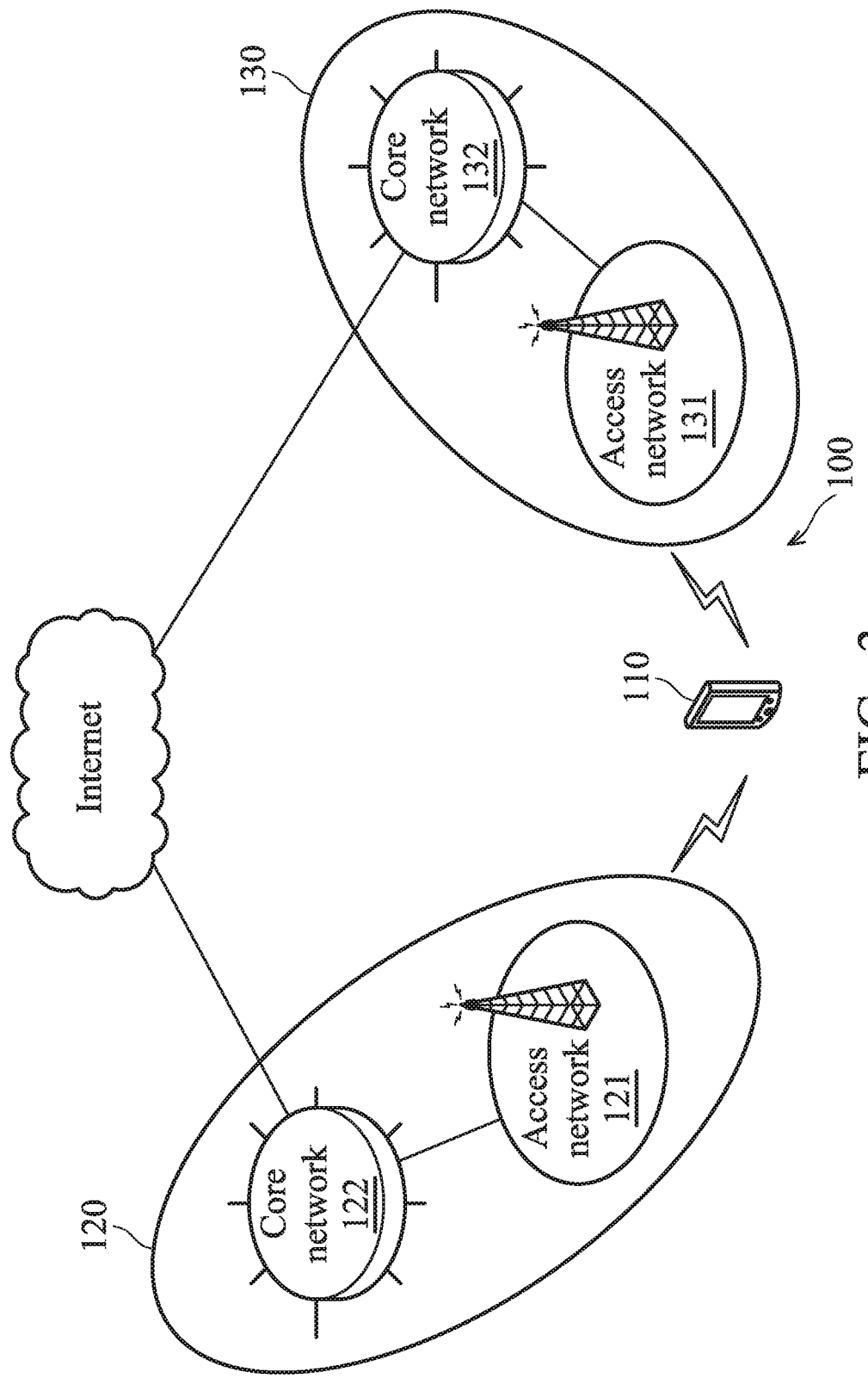
FIG. 3 is a block diagram of a wireless communication environment according to an embodiment of the application.

FIG. 3 is a block diagram of a wireless communication environment according to an embodiment of the application.

As shown in FIG. 3, The wireless communication environment 100 includes a mobile communication device 110 and two service networks 120 and 130, wherein the mobile communication device 110 may wirelessly and selectively communicate with the service network 120 or 130 at a given time for obtaining mobile services using two separate subscriber identities, due to that an RF device is shared by the communication operations associated with two subscriber identities.

The mobile communication device 110 may be referred to as a User Equipment (UE) or Mobile Station (MS), such as a feature phone, a smartphone, a panel Personal Computer (PC), a laptop computer, or any computing device supporting the cellular technologies utilized by the service networks 120 and 130.

Each of the service networks 120 and 130 may be a 2G network (e.g., GSM/GPRS/EDGE/IS-95 network), or a 3G network (e.g., WCDMA/CDMA-2000/TD-SCDMA network, or a 4G network (e.g., LTE/LTE-A/TD-LTE network), or a 5G network (e.g., 5G NR network), or any future cellular network.

The mobile communication device 110 may include two or more sockets, into each of which a respective subscriber identity card may be inserted to provide an individual subscriber identity (also called subscriber number). The subscriber identity cards may provide two separate subscriber identities in compliance with the specifications of the cellular technologies utilized by the service networks 120 and 130, respectively.

For example, one subscriber identity card may be a Subscriber Identity Module (SIM) card if the service network 120 or 130 is a GSM/GPRS/EDGE network, while another subscriber identity card may be a Universal SIM (USIM) card if the service network 120 or 130 is a WCDMA or LTE/LTE-A/TD-LTE network. Alternatively, one subscriber identity card may be a Removable User Identity Module (R-UIM) card if the service network 120 or 130 is a IS-95, CDMA-2000, or CDMA-2000 1× EV-DO network, while another subscriber identity card may be a CDMA subscriber Identity Module (CSIM) card if the service network 120 or 130 is a TD-SCDMA network.

In another embodiment, the subscriber identities may be directly written into the mobile communication device 110, without the need for any socket to insert any subscriber identity card, or the subscriber identities may be provided by only one subscriber identity card or by one or more virtual subscriber identity cards (e.g., eSIM/eUSIM), and the present application is not limited thereto.

Specifically, the service network 120 includes an access network 121 and a core network 122, while the service network 130 includes an access network 131 and a core network 132. Each of the access networks 121 and 131 is responsible for processing radio signals, terminating radio protocols, and connecting the mobile communication device 110 with the core network 122 or 132, while each of the core networks 122 and 132 is responsible for performing mobility management, network-side authentication, and interfaces with public/external networks (e.g., the Internet).

The access networks 121 and 131 and the core networks 122 and 132 may each include one or more network nodes for carrying out said functions. For example, if the service network 120 or 130 is a GSM/GPRS/EDGE network, the access network 121 or 131 may be a GSM EDGE Radio Access Network (GERAN) which includes at least a Base Transceiver Station (BTS) and a Base Station Controller (BSC), and the core network 122 or 132 may be a GPRS core which includes at least a Mobile Switching Center (MSC), Home Location Register (HLR), Serving GPRS Support Node (SGSN), and Gateway GPRS Support Node (GGSN).

If the service network 120 or 130 is a WCDMA network, the access network 121 or 131 may be a Universal Terrestrial Radio Access Network (UTRAN) and the core network 122 or 132 may be a General Packet Radio Service (GPRS) core which includes a Home Location Register (HLR), at least one Serving GPRS Support Node (SGSN), and at least one Gateway GPRS Support Node (GGSN).

If the service network 120 or 130 is an LTE/LTE-A/TD-LTE network, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 120 or 130 is a 5G NR network, the access network 121 or 131 may be a Radio Access Network (RAN) which includes at least a gNB or Transmission Reception Point (TRP), and the core network 122 or 132 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

Figure 4:
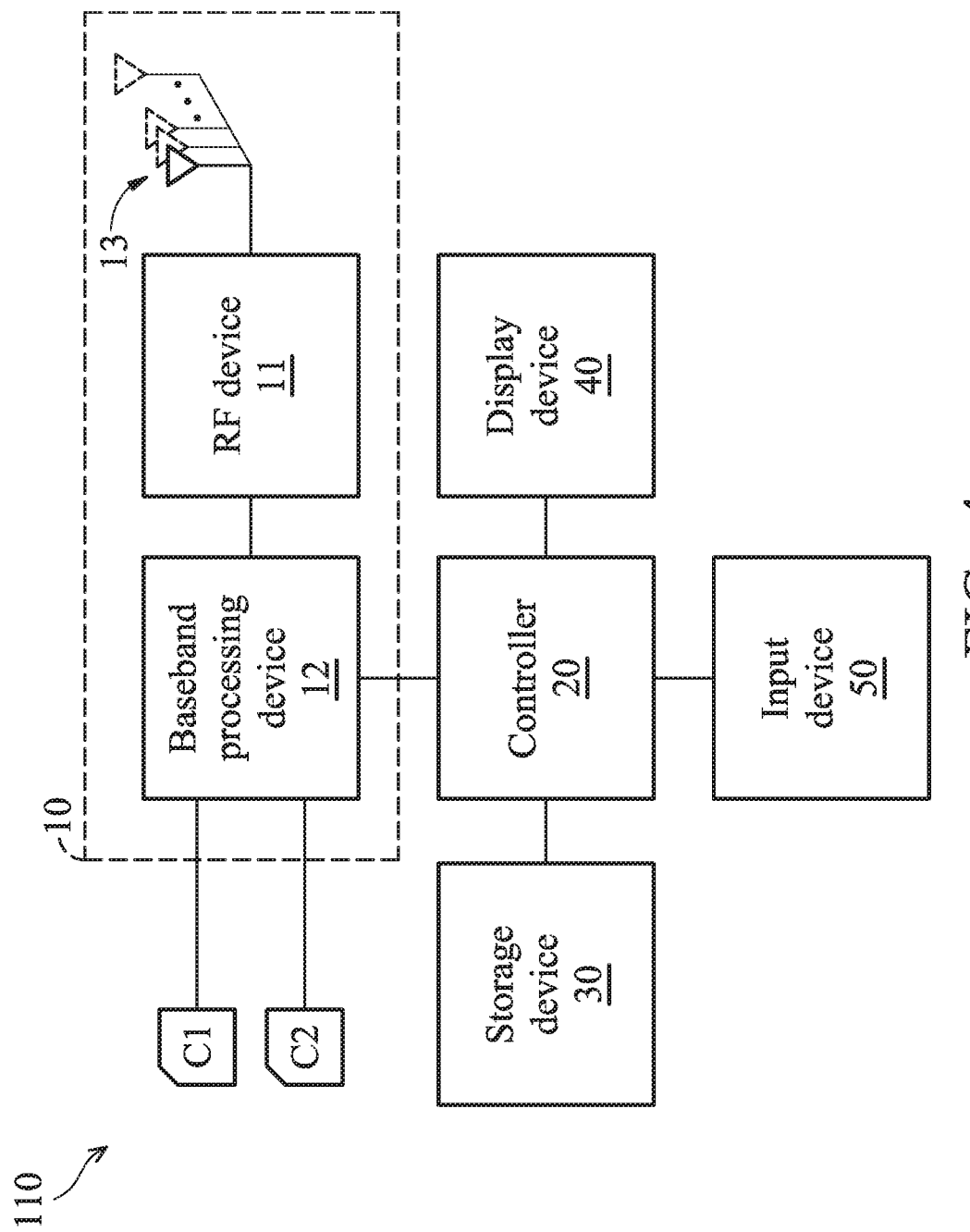
FIG. 4 is a block diagram illustrating the mobile communication device 110 according to an embodiment of the application.

FIG. 4 is a block diagram illustrating the mobile communication device 110 according to an embodiment of the application.

As shown in FIG. 4, the mobile communication device 110 includes a wireless transceiver 10, a controller 20, a storage device 30, a display device 40, and an Input/Output (I/O) device 50.

The wireless transceiver 10 is configured to perform wireless transmission and reception to and from the cells formed by the service networks 120 and 130 using two subscriber identity cards (denoted as C1 and C2 in FIG. 4). Specifically, the wireless transceiver 10 includes an RF device 11, a baseband processing device 12, and antenna(s) 13.

The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 850 MHz, 1900 MHz, or 2100 MHz utilized in IS-95/CDMA-2000/CDMA-2000 1× EV-DO technology, or may be 900 MHz, 2100 MHz, or 2.6 GHz utilized in LTE/LTE-A/TD-LTE technology, or any radio frequency (e.g., 30 GHz-300 GHz for mmWave) utilized in 5G (e.g., NR) systems, or another radio frequency, depending on the cellular technology in use.

The baseband processing device 12 is configured to perform baseband signal processing and control the communications between the subscriber identity cards C1 and C2 and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, a dual-card controller (not shown) may be coupled between the baseband processing device 12 and the subscriber identity cards C1 and C2 for powering the subscriber identity cards C1 and C2 with the same or different voltage levels according to the requirements thereof by a Power Management Integrated Chip (PMIC) and a battery, wherein the voltage level for each subscriber identity card is determined during initiation. The baseband processing device 12 may read data from one of the subscriber identity cards C1 and C2, and writes data to one of the subscriber identity cards C1 and C2 via the dual-card controller. In addition, the dual-card controller selectively transfers clocks, resets, and/or data signals to the subscriber identity cards C1 and C2 according to instructions issued by the baseband processing device 12.

In another embodiment, the baseband processing device 12 may include two interfaces (not shown) which independently handle the connections to the subscriber identity cards C1 and C2. It should be understood that the hardware architecture shown in FIG. 4 may be modified to include more than two subscriber identity cards or include only one subscriber identity card, and the application should not be limited thereto.

The controller 20 may be a general-purpose processor, a Micro Control Unit (MCU), an application processor, a Digital Signal Processor (DSP), or the like, which includes various circuits for providing the function of data processing and computing, controlling the wireless transceiver 10 for coordinating the communication operations associated with two separate subscriber identities provided by the subscriber identity cards C1 and C2, storing and retrieving data to and from the storage device 30, sending a series of frame data (e.g. representing text messages, graphics, images, etc.) to the display device 40, and receiving signals from the I/O device 50.

In another embodiment, the controller 20 may be incorporated into the baseband processing device 12, serving as a baseband processor which may coordinate the aforementioned operations of the wireless transceiver 10, the storage device 30, the display device 40, and the I/O device 50 for performing the method for synchronizing states of separate subscriber identities with network.

As will be appreciated by persons skilled in the art, the circuits of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, Organic LED (OLED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 4 are for illustrative purposes only and are not intended to limit the scope of the application. For example, the mobile communication device 110 may further include a Wireless-Fidelity (Wi-Fi) device for providing the function of WiFi communications, a Global Positioning System (GPS) device for use of some location-based services or applications, and/or power, etc. Alternatively, the mobile communication device 110 may include fewer components. For example, the mobile communication device 110 may not include the display device 40 and/or the I/O device 50.

Figure 5:
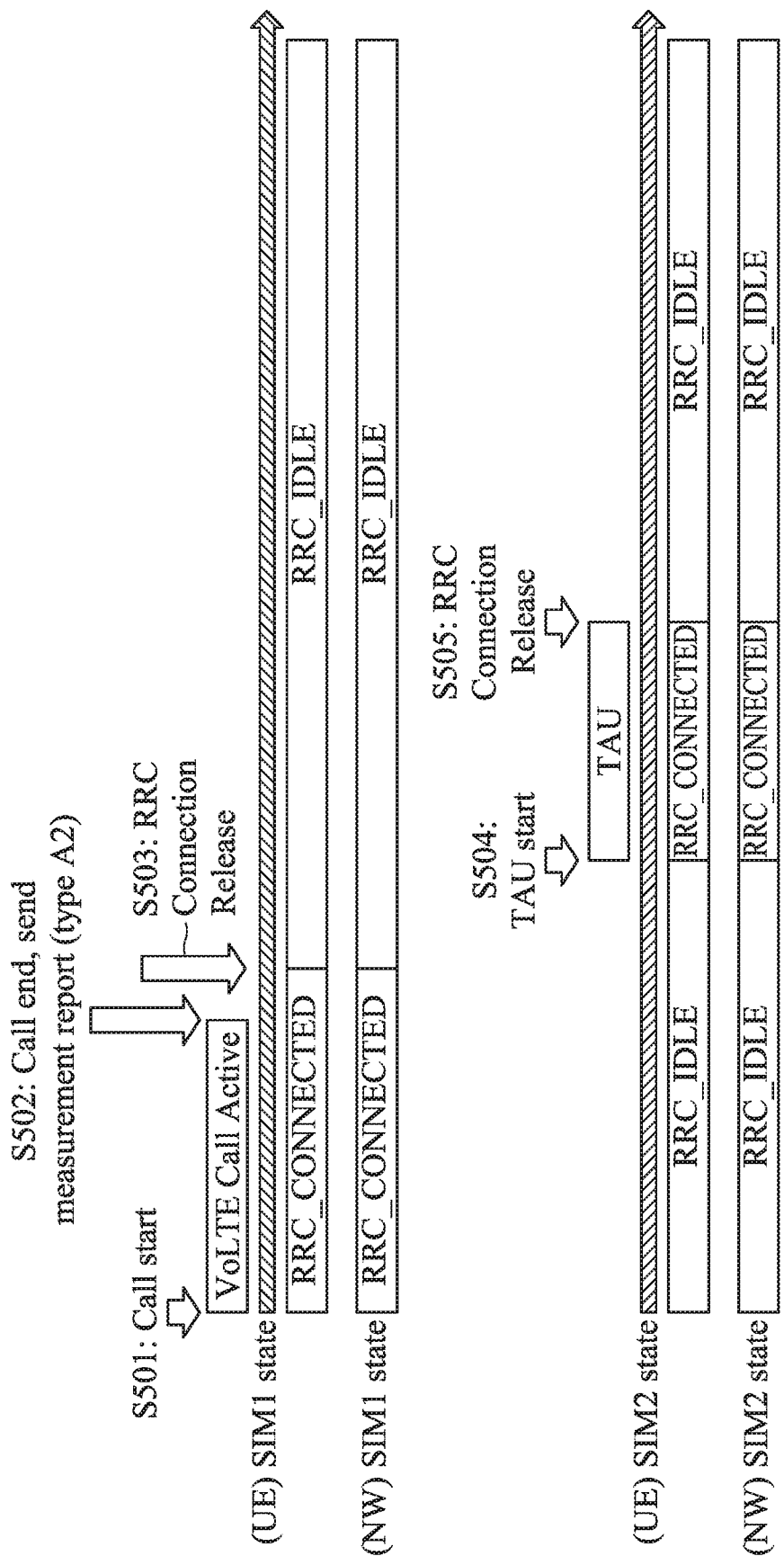
FIG. 5 is a block diagram illustrating the communication operations associated with two separate subscriber identities in a mobile communication device including an RF device according to an embodiment of the application.

FIG. 5 is a block diagram illustrating the communication operations associated with two separate subscriber identities in a mobile communication device including an RF device according to an embodiment of the application.

In this embodiment, two subscriber identities may be used to communicate with two separate service networks or with the same service network.

As shown in FIG. 5, the first subscriber identity (denoted as SIM1) is used to make a VoLTE call (step S501), and during the voice call procedure, the state of SIM1 is in the RRC_CONNECTED mode and is synchronized between the UE (e.g., the mobile communication device 110) and the service network (e.g., the service network 120/130).

When the VoLTE call ends, the UE uses SIM1 to send a measurement report to the serving cell of the service network, wherein the measurement report indicates that the (reported) signal quality of the serving cell is poor enough to release the current connection (e.g., a value representing a worst signal quality may be filled in the measurement report) (step S502). For example, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

In one embodiment, the measurement report may include an event type that is set to A2 defined in the Third Generation Partnership Project (3GPP) specifications, and may be used to trigger the service network to release the connection. Specifically, the measurement report may be sent regardless of whether the truly measured signal quality of the serving cell is poor enough or not. In other words, the measurement report may be sent even when the truly measured signal quality of the serving cell is good enough (i.e., not poor enough) to keep the current connection (i.e., the truly measured signal quality of the serving cell is equal to or greater than the threshold preconfigured by network).

After sending the measurement report, the UE receives an RRC Connection Release message for SIM1 from the service network and in response, releases the connection associated with SIM1 and the state of SIM1 enters the RRC_IDLE mode (step S503).

That is, the state of SIM1 is switched from the RRC_CONNECTED mode to the RRC_IDLE mode on both the UE and the service network as soon as possible after completing the voice call procedure, thereby keeping the state of SIM1 synchronized between the UE and the service network.

Next, the second subscriber identity (denoted as SIM2) may initiate a signaling procedure (e.g., a TAU procedure) (step S504). During the signaling procedure, the state of SIM2 is switched from the RRC_IDLE mode to the RRC_CONNECTED mode on both the UE and the service network.

Subsequently, when the signaling procedure associated with SIM2 is completed, the UE receives an RRC Connection Release message for SIM2 from the service network and in response, releases the connection associated with SIM2, and the state of SIM2 is switched from the RRC_CONNECTED mode to the RRC_IDLE mode on both the UE and the service network (step S505).

Figure 1:
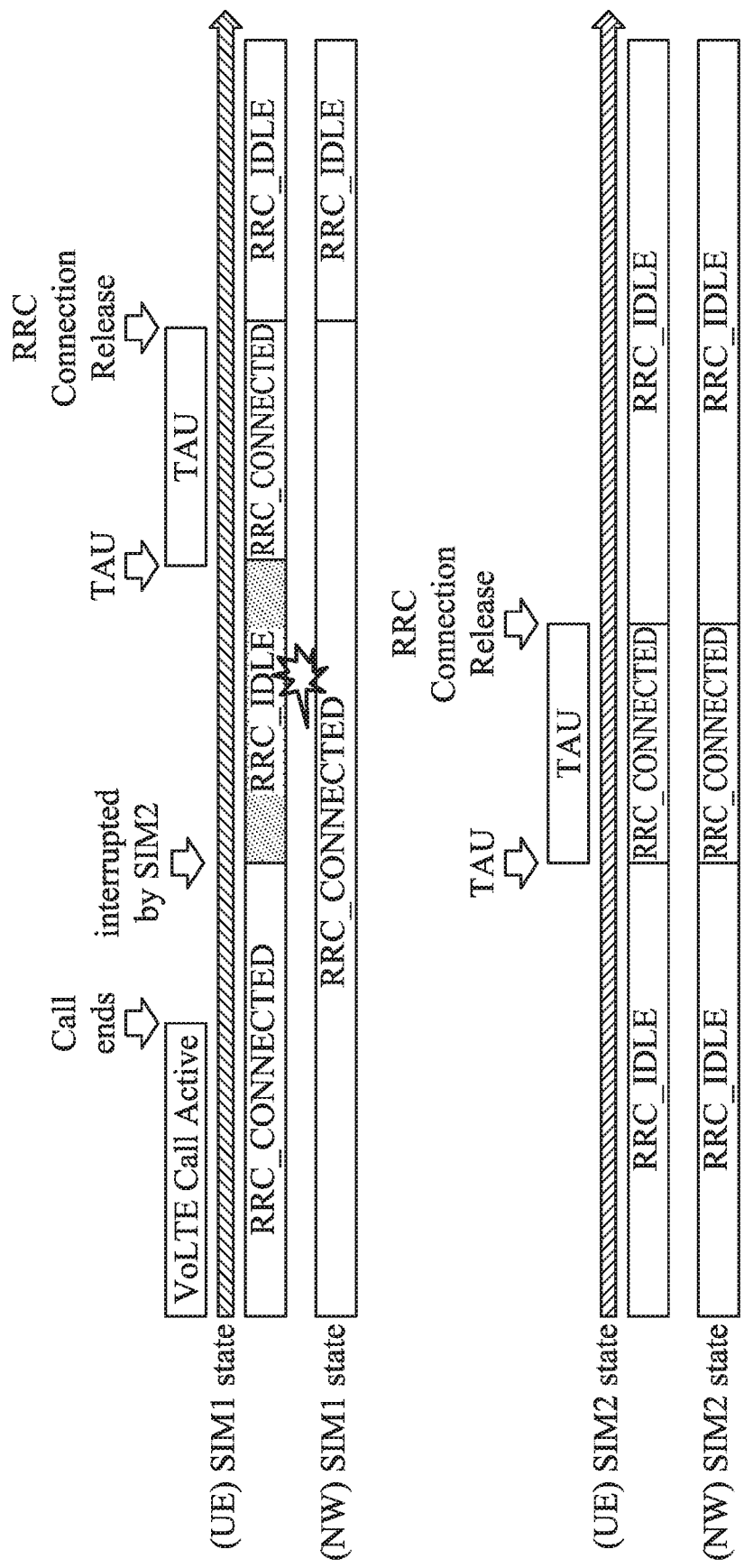
FIG. 1 shows an exemplary scenario of communication operations associated with two subscriber identities in a conventional dual-card UE with an RF device.

Please note that, during the signaling procedure associated with SIM2 (i.e., steps S504~S505), the state of SIM1 is synchronized between the UE and the service network. That is, unlike the conventional design of FIG. 1, the embodiment of FIG. 5 may keep the SIM state synchronized between the UE and the network. Advantageously, the problem of missing MT call due to unsynchronized SIM state may be avoided.

Figure 6:
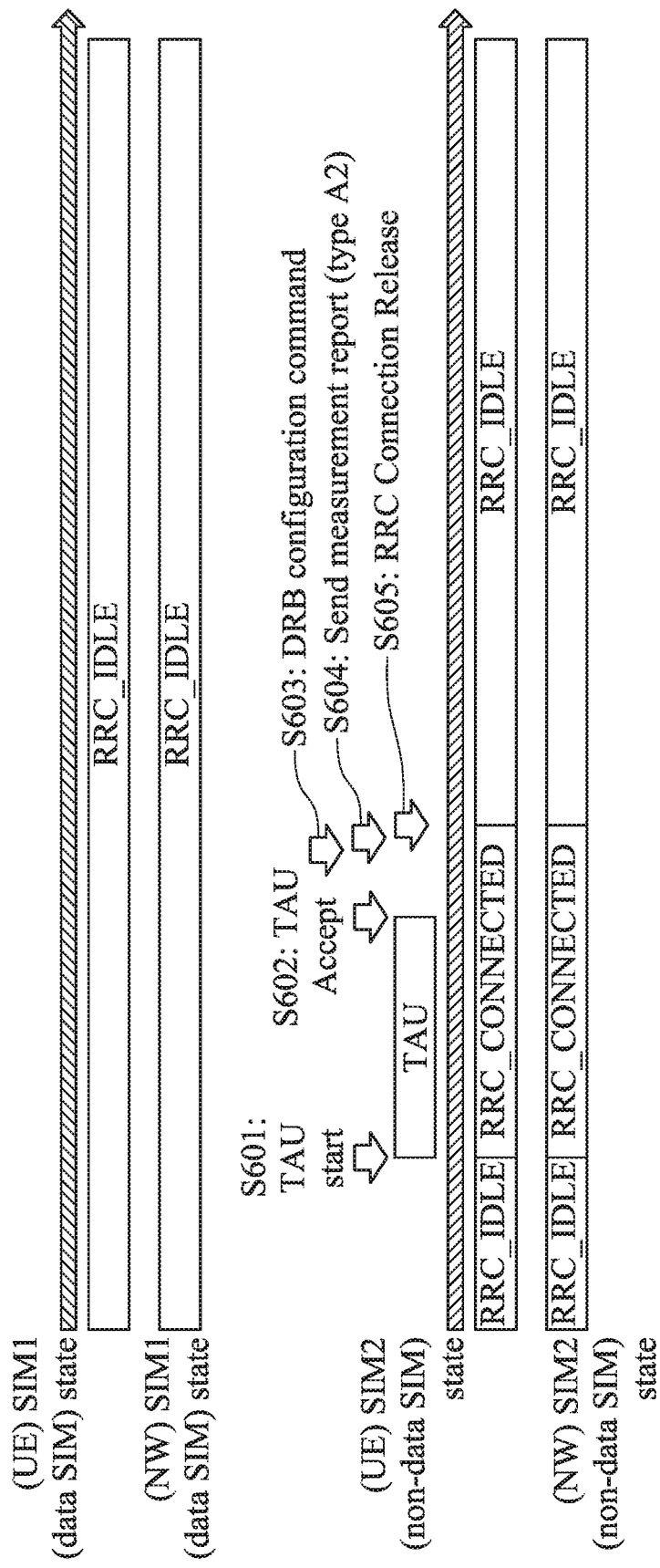
FIG. 6 is a block diagram illustrating the communication operations associated with two separate subscriber identities in a mobile communication device including an RF device according to another embodiment of the application.

FIG. 6 is a block diagram illustrating the communication operations associated with two separate subscriber identities in a mobile communication device including an RF device according to another embodiment of the application.

In this embodiment, one SIM is configured as a data SIM, while the other SIM is configured as a non-data SIM.

As shown in FIG. 6, the second subscriber identity (denoted as SIM2) is used to initiate a signaling procedure (e.g., a TAU procedure) (step S601). During the signaling procedure, the state of SIM2 is switched from the RRC_IDLE mode to the RRC_CONNECTED mode on both the UE and the service network.

After the completion of the signaling procedure associated with SIM2 (step S602), the UE receives a Data Radio Bearer (DRB) configuration command for SIM2 from the service network (step S603). When the configuration of DRB ends, the UE uses SIM2 to send a measurement report to the serving cell of the service network, wherein the measurement report indicates that the (reported) signal quality of the serving cell is poor enough to release the current connection (step S604). For example, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

In one embodiment, the measurement report may include an event type that is set to A2 defined in the 3GPP specifications, and may be used to trigger the service network to release the connection. Specifically, the measurement report may be sent regardless of whether the truly measured signal quality of the serving cell is poor enough or not. In other words, the measurement report may be sent even when the truly measured signal quality of the serving cell at approximately the same time is good enough (i.e., not poor enough) to keep the current connection (i.e., the truly measured signal quality of the serving cell is equal to or greater than the threshold preconfigured by network).

After sending the measurement report, the UE receives an RRC Connection Release message for SIM2 from the service network and in response, releases the connection associated with SIM2 and the state of SIM2 enters the RRC_IDLE mode (step S605).

That is, the state of SIM2 is switched from the RRC_CONNECTED mode to the RRC_IDLE mode on both the UE and the service network as soon as possible after completing the configuration of DRB subsequent to a TAU procedure, thereby keeping the state of SIM2 synchronized between the UE and the service network.

Figure 2:
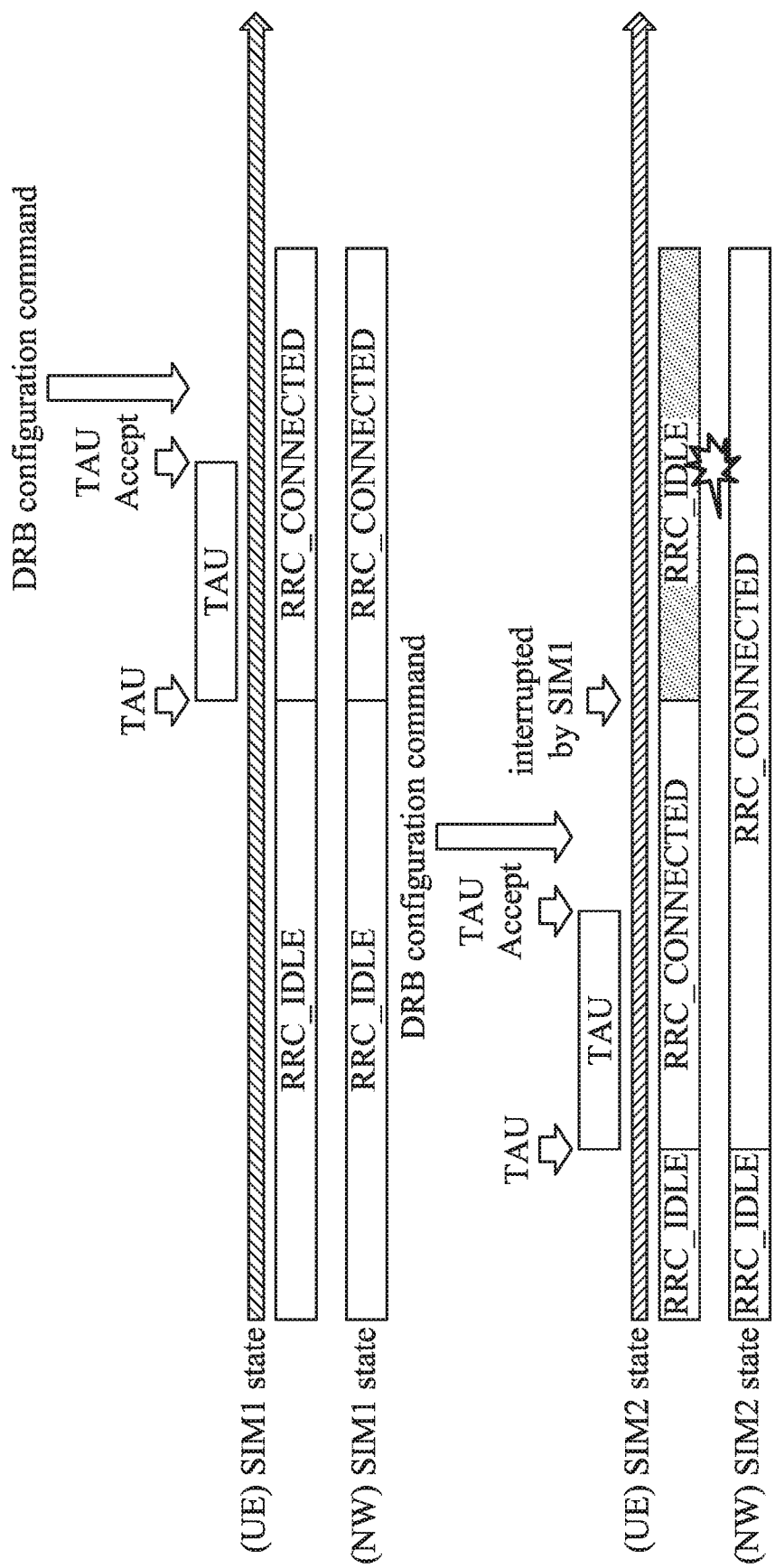
FIG. 2 shows another exemplary scenario of communication operations associated with two subscriber identities in a conventional dual-card UE with an RF device.

Please note that, unlike the conventional design of FIG. 2, the embodiment of FIG. 6 may keep the SIM state synchronized between the UE and the network. Advantageously, the problem of missing MT call due to unsynchronized SIM state may be avoided.

In one embodiment, the RRC Connection Release message received in steps S503 and S605 may not include redirection information, and the UE may directly release the connection and enter the RRC_IDLE mode.

In another embodiment, the RRC Connection Release message received in steps S503 and S605 may include redirection information which indicates the UE to go to other Radio Access Technology (RAT), and the UE may ignore the redirection information and then release the connection. Alternatively, the UE may ignore the redirection information, and then act like it has tried to follow the redirection information but failed, by performing a TAU procedure with the same network.

Figure 7:
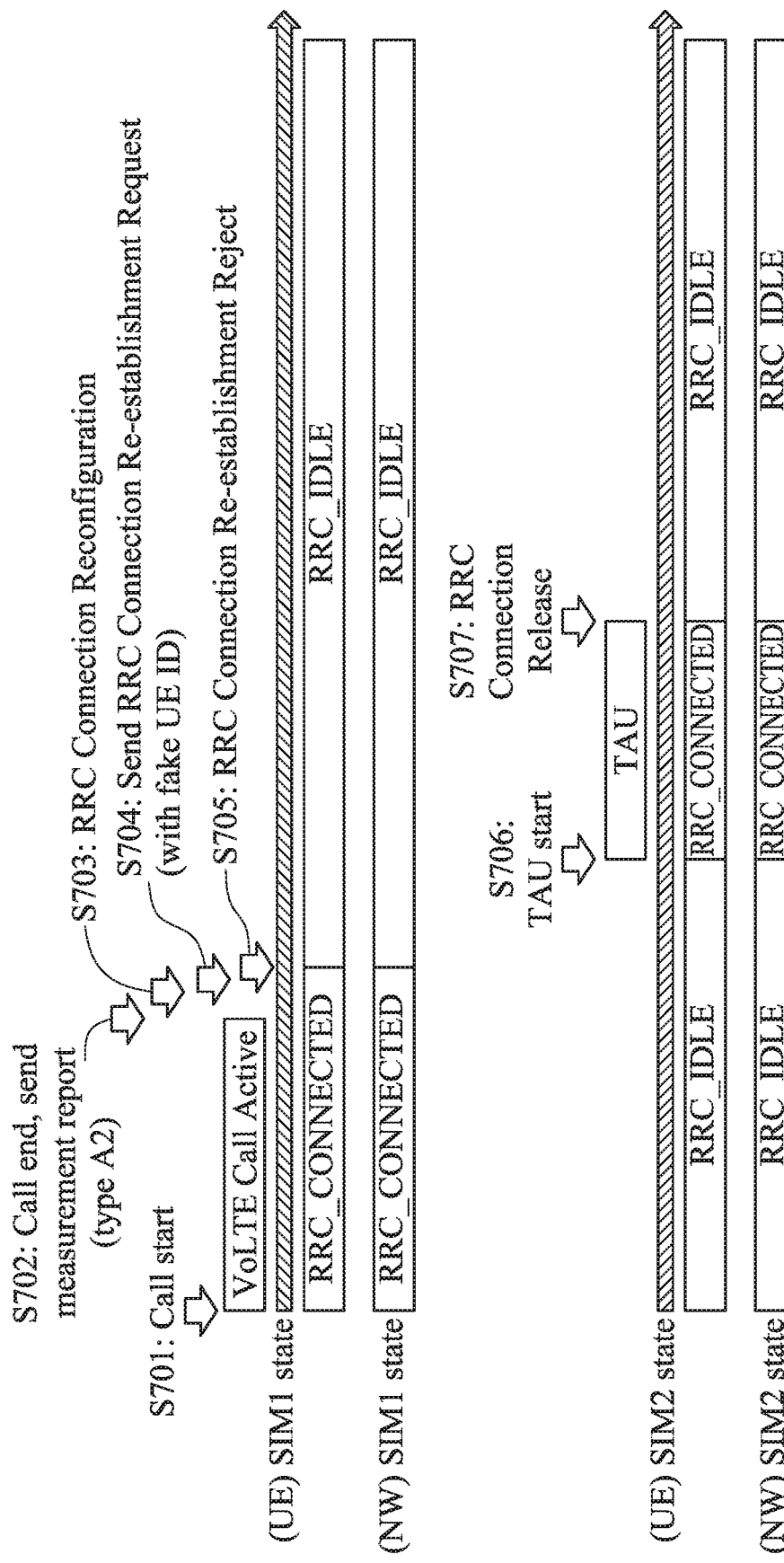
FIG. 7 is a block diagram illustrating the communication operations associated with two separate subscriber identities in a mobile communication device including an RF device according to another embodiment of the application.

FIG. 7 is a block diagram illustrating the communication operations associated with two separate subscriber identities in a mobile communication device including an RF device according to another embodiment of the application.

In this embodiment, two subscriber identities may be used to communicate with two separate service networks or with the same service network.

As shown in FIG. 7, the first subscriber identity (denoted as SIM1) is used to make a VoLTE call (step S701), and during the voice call procedure, the state of SIM1 is in the RRC_CONNECTED mode and is synchronized between the UE (e.g., the mobile communication device 110) and the service network (e.g., the service network 120/130).

When the VoLTE call ends, the UE uses SIM1 to send a measurement report to the serving cell of the service network, wherein the measurement report indicates that the (reported) signal quality of the serving cell is poor enough to release the current connection (step S702). For example, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

In one embodiment, the measurement report may include an event type that is set to A2 defined in the 3GPP specifications, and may be sent regardless of whether the truly measured signal quality of the serving cell is poor enough or not. In other words, the measurement report may be sent even when the truly measured signal quality of the serving cell at approximately the same time is good enough (i.e., not poor enough) to keep the current connection (i.e., the truly measured signal quality of the serving cell is equal to or greater than the threshold preconfigured by network).

After sending the measurement report, the UE receives an RRC Connection Reconfiguration message for SIM1, which may include new measurement configuration, from the service network (step S703). Due to that the UE does not receive an RRC Connection Release message for SIM1 from the service network in response to sending the measurement report, it is desirable to have another way of triggering the service network to release the connection.

In response not receiving an RRC CONNECTION RELEASE for SIM1 message, the UE uses SIM1 to send an RRC Connection Re-establishment Request message including a fake UE identity that is different from the UE's real identity to the serving cell (step S704).

Subsequently, the UE receives an RRC Connection Re-establishment Reject message for SIM1 from the service network and in response, releases the connection associated with SIM1 and the state of SIM1 enters the RRC_IDLE mode (step S705).

That is, although the measurement report of event type A2 does not successfully triggers the service network to release the connection associated with SIM1, the UE can still send an RRC Connection Re-establishment Request message including a fake UE identity to trigger the service network to send an RRC Connection Re-establishment Reject message. According to the 3GPP TS 36.331 specification, the UE should release the connection and enter the RRC_IDLE mode.

Therefore, the state of SIM1 is switched from the RRC_CONNECTED mode to the RRC_IDLE mode on both the UE and the service network as soon as possible after completing the voice call procedure, thereby keeping the state of SIM1 synchronized between the UE and the service network.

Next, the second subscriber identity (denoted as SIM2) is used to initiate a signaling procedure (e.g., a TAU procedure) (step S706). During the signaling procedure, the state of SIM2 is switched from the RRC_IDLE mode to the RRC_CONNECTED mode on both the UE and the service network.

Subsequently, when the signaling procedure associated with SIM2 is completed, the UE receives an RRC Connection Release message for SIM2 from the service network and in response, releases the connection associated with SIM2, and the state of SIM2 is switched from the RRC_CONNECTED mode to the RRC_IDLE mode on both the UE and the service network (step S707).

Please note that, unlike the embodiments of FIGS. 5 and 6, the embodiment of FIG. 7 provides an alternative to trigger to service network to release the connection when sending a measurement report of the event type A2 does not work.

It will be appreciated that the embodiments of FIGS. 5-7 proposes to keep the SIM state synchronized between the UE and the network as soon as possible when a voice call procedure or a signaling procedure associated with one subscriber identity is completed, while the other embodiments of the present application (described latter in FIGS. 8~10) proposes to delay the synchronization of SIM state until a voice call procedure or a signaling procedure associated with one subscriber identity is interrupted by another procedure associated with another subscriber identity.

Figure 8:
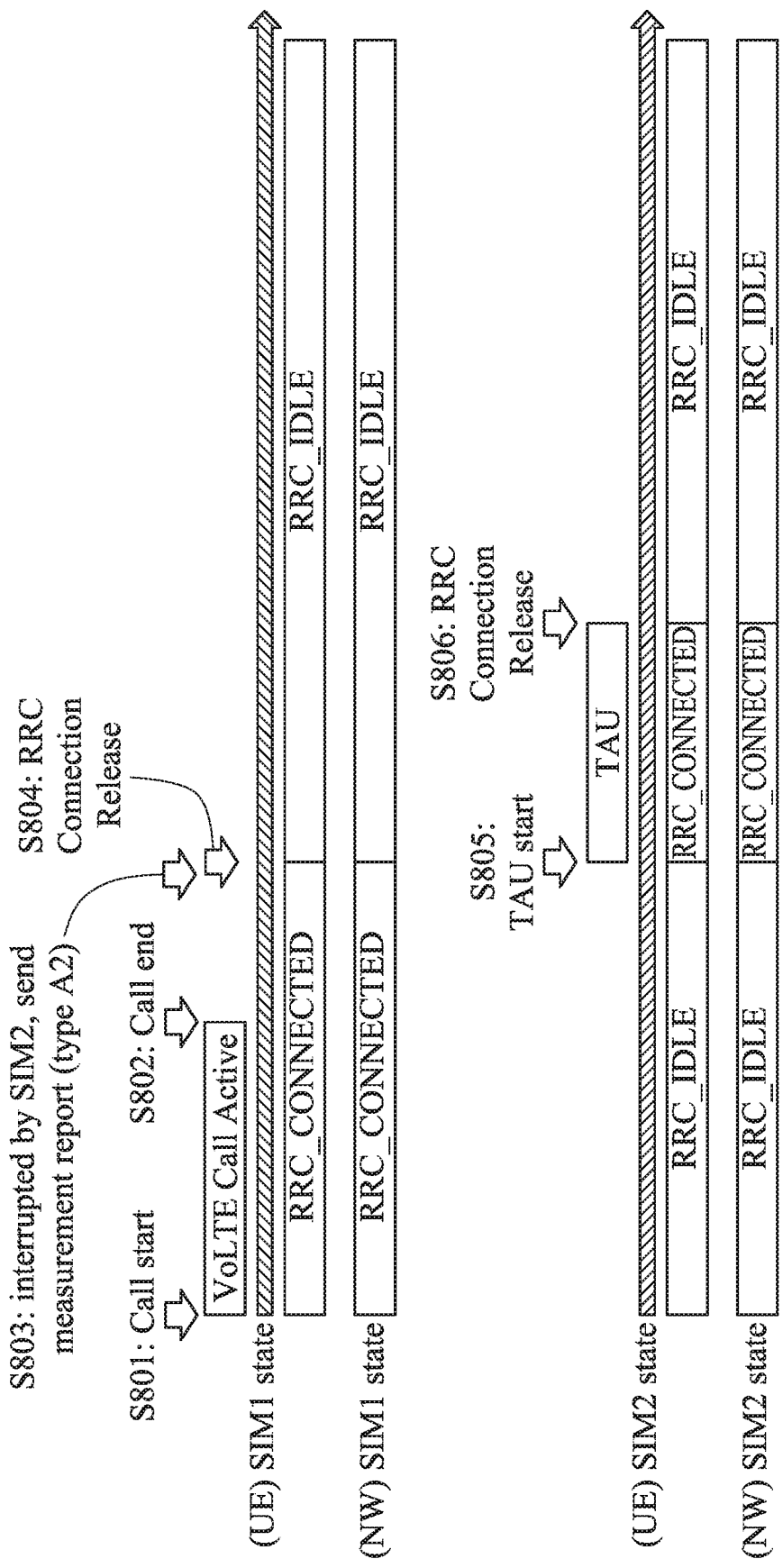
FIG. 8 is a block diagram illustrating the communication operations associated with two separate subscriber identities in a mobile communication device including an RF device according to another embodiment of the application.

FIG. 8 is a block diagram illustrating the communication operations associated with two separate subscriber identities in a mobile communication device including an RF device according to another embodiment of the application.

In this embodiment, two subscriber identities may be used to communicate with two separate service networks or with the same service network.

As shown in FIG. 8, the first subscriber identity (denoted as SIM1) is used to make a VoLTE call (step S801), and during the voice call procedure, the state of SIM1 is in the RRC_CONNECTED mode and is synchronized between the UE (e.g., the mobile communication device 110) and the service network (e.g., the service network 120/130).

Unlike the embodiment of FIG. 5, when the VoLTE call ends (step S802), the connection associated with SIM1 remains until being interrupted by a communication procedure (e.g., a voice call procedure or a signaling procedure) associated with SIM2. That is, when SIM1 is interrupted by the communication procedure associated with SIM2, the UE uses SIM1 to send a measurement report to the serving cell of the service network, wherein the measurement report indicates that the reported signal quality of the serving cell is poor enough to release the current connection (step S803). For example, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

In one embodiment, the measurement report may include an event type that is set to A2 defined in the 3GPP specifications, and may be sent regardless of whether the truly measured signal quality of the serving cell is poor enough or not. In other words, the measurement report may be sent even when the truly measured signal quality of the serving cell at approximately the same time is good enough (i.e., not poor enough) to keep the current connection (i.e., the truly measured signal quality of the serving cell is equal to or greater than the threshold preconfigured by network).

After sending the measurement report, the UE receives an RRC Connection Release message for SIM1 from the service network and in response, releases the connection associated with SIM1 and the state of SIM1 enters the RRC_IDLE mode (step S804).

Subsequently, the UE uses SIM2 to initiate a communication procedure (e.g., a TAU procedure) (step S805). During the communication procedure, the state of SIM2 is switched from the RRC_IDLE mode to the RRC_CONNECTED mode on both the UE and the service network.

Subsequently, when the communication procedure associated with SIM2 is completed, the UE receives an RRC Connection Release message for SIM2 from the service network and in response, releases the connection associated with SIM2, and the state of SIM2 is switched from the RRC_CONNECTED mode to the RRC_IDLE mode on both the UE and the service network (step S806).

Please note that, during the communication procedure associated with SIM2 (i.e., steps S805~S806), the state of SIM1 is synchronized between the UE and the service network. That is, unlike the conventional design of FIG. 1, the embodiment of FIG. 8 may keep the SIM state synchronized between the UE and the network. Advantageously, the problem of missing MT call due to unsynchronized SIM state may be avoided.

Figure 9:
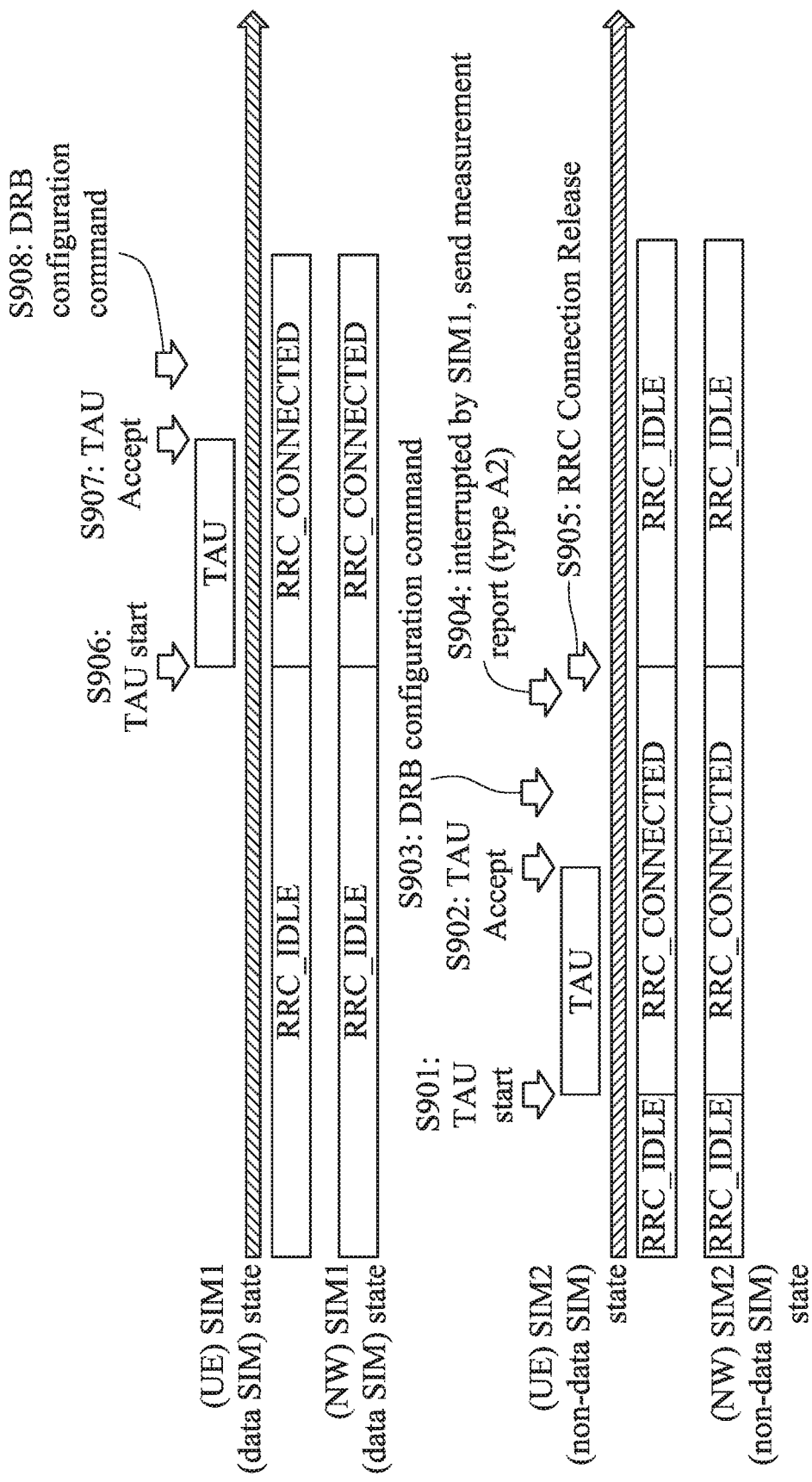
FIG. 9 is a block diagram illustrating the communication operations associated with two separate subscriber identities in a mobile communication device including an RF device according to another embodiment of the application.

FIG. 9 is a block diagram illustrating the communication operations associated with two separate subscriber identities in a mobile communication device including an RF device according to another embodiment of the application.

In this embodiment, two subscriber identities may be used to communicate with two separate service networks or with the same service network.

As shown in FIG. 9, the second subscriber identity (denoted as SIM2) is used to initiate a signaling procedure (e.g., a TAU procedure) (step S901). During the signaling procedure, the state of SIM2 is switched from the RRC_IDLE mode to the RRC_CONNECTED mode on both the UE and the service network.

After the completion of the signaling procedure associated with SIM2 (step S902), the UE receives a DRB configuration command for SIM2 from the service network (step S903).

Unlike the embodiment of FIG. 6, when the configuration of DRB ends, the connection associated with SIM2 remains until being interrupted by a communication procedure (e.g., a voice call procedure or a signaling procedure) associated with SIM1. That is, when SIM2 is interrupted by the communication procedure associated with SIM1, the UE uses SIM2 to send a measurement report to the serving cell of the service network, wherein the measurement report indicates that the (reported) signal quality of the serving cell is poor enough to release the current connection (step S904). Specifically, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

In one embodiment, the measurement report may include an event type that is set to A2 defined in the 3GPP specifications, and may be sent regardless of whether the truly measured signal quality of the serving cell is poor enough or not. In other words, the measurement report may be sent even when the truly measured signal quality of the serving cell at approximately the same time is good enough (i.e., not poor enough) to keep the current connection (i.e., the truly measured signal quality of the serving cell is equal to or greater than the threshold preconfigured by network).

After sending the measurement report, the UE receives an RRC Connection Release message for SIM2 from the service network and in response, releases the connection associated with SIM2 and the state of SIM2 enters the RRC_IDLE mode (step S905).

Subsequently, the UE uses SIM1 to initiate a communication procedure (e.g., a TAU procedure) (step S906). During the communication procedure, the state of SIM1 is switched from the RRC_IDLE mode to the RRC_CONNECTED mode on both the UE and the service network.

After the completion of the communication procedure associated with SIM1 (step S907), the UE receives a DRB configuration command for SIM1 from the service network (step S908). When the configuration of DRB ends, the connection associated with SIM1 remains as there being no interruption from the peer SIM.

Please note that, during the communication procedure associated with SIM1 (i.e., steps S805~S806), the state of SIM2 is synchronized between the UE and the service network. That is, unlike the conventional design of FIG. 2, the embodiment of FIG. 9 may keep the SIM state synchronized between the UE and the network. Advantageously, the problem of missing MT call due to unsynchronized SIM state may be avoided.

Figure 10:
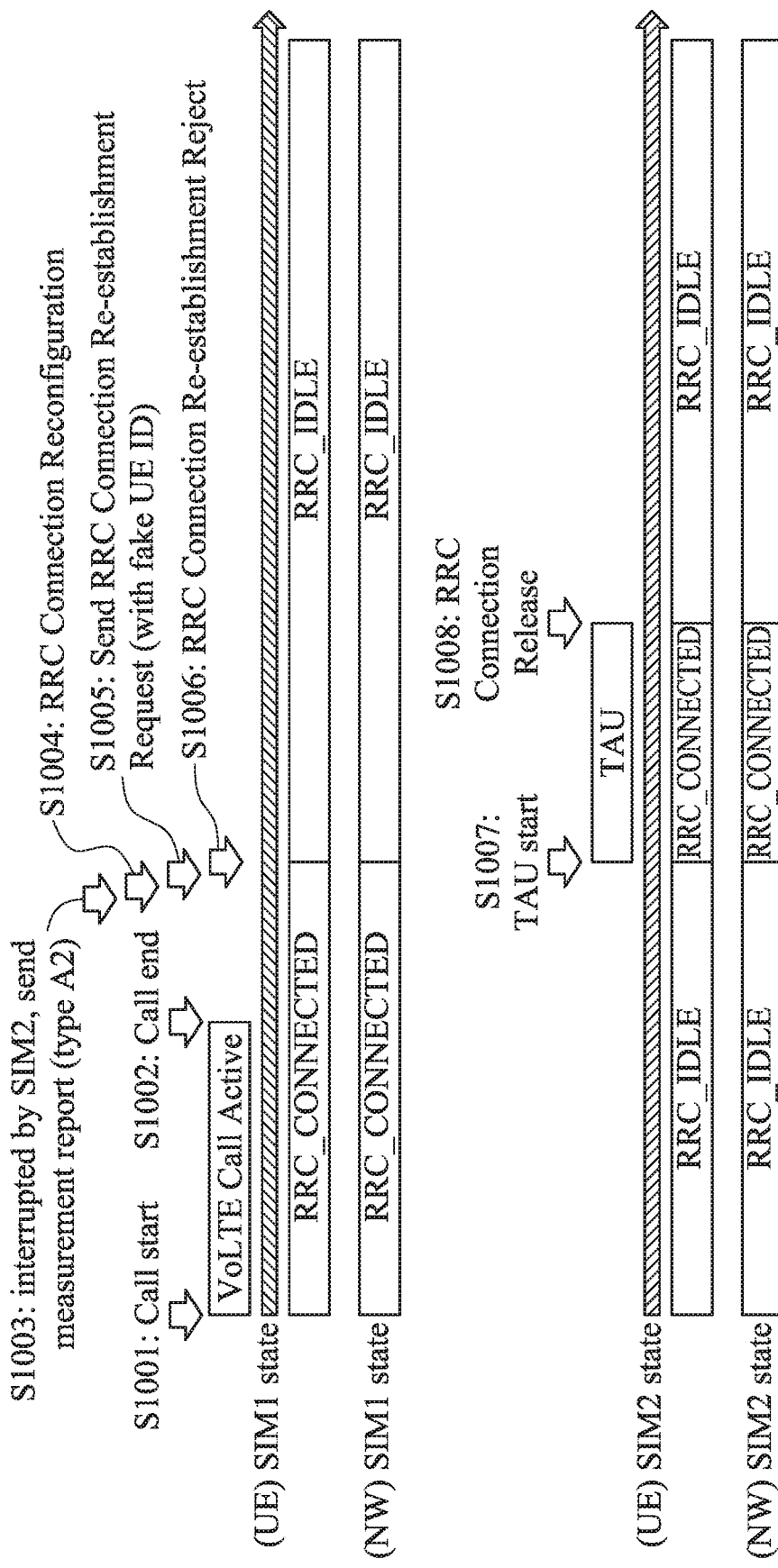
FIG. 10 is a block diagram illustrating the communication operations associated with two separate subscriber identities in a mobile communication device including an RF device according to another embodiment of the application.

FIG. 10 is a block diagram illustrating the communication operations associated with two separate subscriber identities in a mobile communication device including an RF device according to another embodiment of the application.

In this embodiment, two subscriber identities may be used to communicate with two separate service networks or with the same service network.

As shown in FIG. 10, the first subscriber identity (denoted as SIM1) is used to make a VoLTE call (step S1001), and during the voice call procedure, the state of SIM1 is in the RRC_CONNECTED mode and is synchronized between the UE (e.g., the mobile communication device 110) and the service network (e.g., the service network 120/130).

Unlike the embodiment of FIG. 7, when the VoLTE call ends (step S1002), the connection associated with SIM1 remains until being interrupted by a communication procedure (e.g., a voice call procedure or a signaling procedure) associated with SIM2. That is, when SIM1 is interrupted by the communication procedure associated with SIM2, the UE uses SIM1 to send a measurement report to the serving cell of the service network, wherein the measurement report indicates that the (reported) signal quality of the serving cell is poor enough to release the connection (step S1003). Specifically, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

In one embodiment, the measurement report may include an event type that is set to A2 defined in the 3GPP specifications, and may be sent regardless of whether the truly measured signal quality of the serving cell is poor enough or not. In other words, the measurement report may be sent even when the truly measured signal quality of the serving cell at approximately the same time is good enough (i.e., not poor enough) to keep the current connection (i.e., the truly measured signal quality of the serving cell is equal to or greater than the threshold preconfigured by network).

After sending the measurement report, the mobile communication device does not receive an RRC CONNECTION RELEASE message for SIM1 from the service network. Instead, the mobile communication device may receive an RRC Connection Reconfiguration message for SIM1 from the service network (step S1004). In response to receiving the RRC Connection Reconfiguration message, the UE uses SIM1 to send an RRC Connection Re-establishment Request message including a fake UE identity that is different from the UE's real identity to the serving cell (step S1005).

Subsequently, the UE receives an RRC Connection Re-establishment Reject message for SIM1 from the service network and in response, releases the connection associated with SIM1 and the state of SIM1 enters the RRC_IDLE mode (step S1006).

After that, the UE uses SIM2 to initiate a communication procedure (e.g., a TAU procedure) (step S1007). During the communication procedure, the state of SIM2 is switched from the RRC_IDLE mode to the RRC_CONNECTED mode on both the UE and the service network.

When the communication procedure associated with SIM2 is completed, the UE receives an RRC Connection Release message for SIM2 from the service network and in response, releases the connection associated with SIM2, and the state of SIM2 is switched from the RRC_CONNECTED mode to the RRC_IDLE mode on both the UE and the service network (step S1008).

Please note that, during the communication procedure associated with SIM2 (i.e., steps S1007~S1008), the state of SIM1 is synchronized between the UE and the service network. That is, unlike the conventional design of FIG. 1, the embodiment of FIG. 8 may keep the SIM state synchronized between the UE and the network. Advantageously, the problem of missing MT call due to unsynchronized SIM state may be avoided.

In another embodiment, the UE may first determine whether the interrupting communication procedure associated with one subscriber identity has a higher priority level than the interrupted communication procedure associated with another subscriber identity, and if so, allow the interruption to happen (i.e., allow the interrupting communication procedure associated with one subscriber identity to take over the RF device from the interrupted communication procedure associated with another subscriber identity). Otherwise, if the interrupting communication procedure associated with one subscriber identity does not have a higher priority level than the interrupted communication procedure associated with another subscriber identity, the interrupted communication procedure may continue to occupy the RF device.

For example, a voice call (including VoLTE call, data call, Circuit-Switched (CS) call, and Packet-Switched (PS) call) procedure may have a higher priority level than a signaling procedure (e.g., a TAU procedure).

Figure 11A:
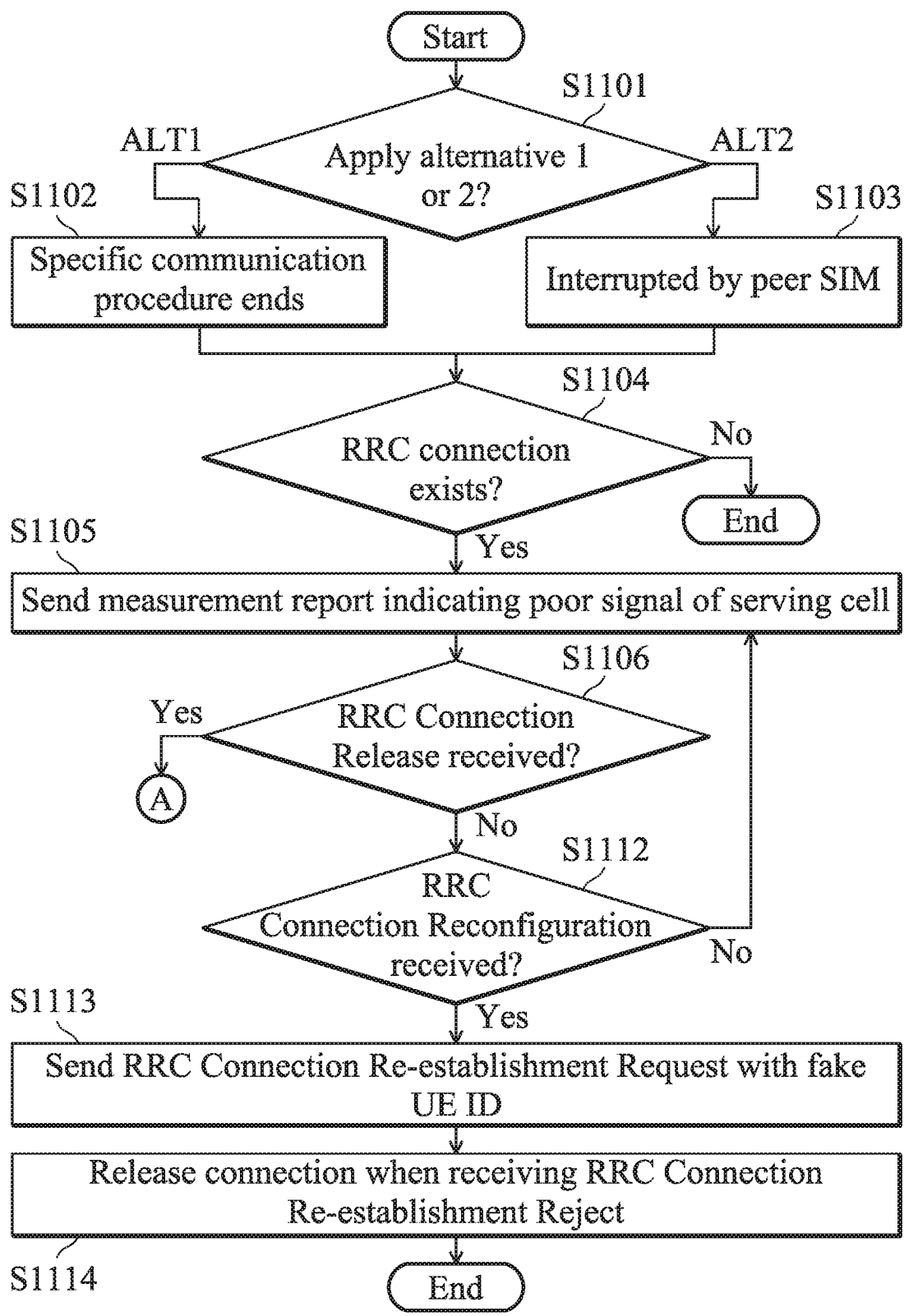
FIGS. 11A and 11B show a flow chart illustrating the method for synchronizing states of separate subscriber identities with network according to an embodiment of the application.
Figure 11B:
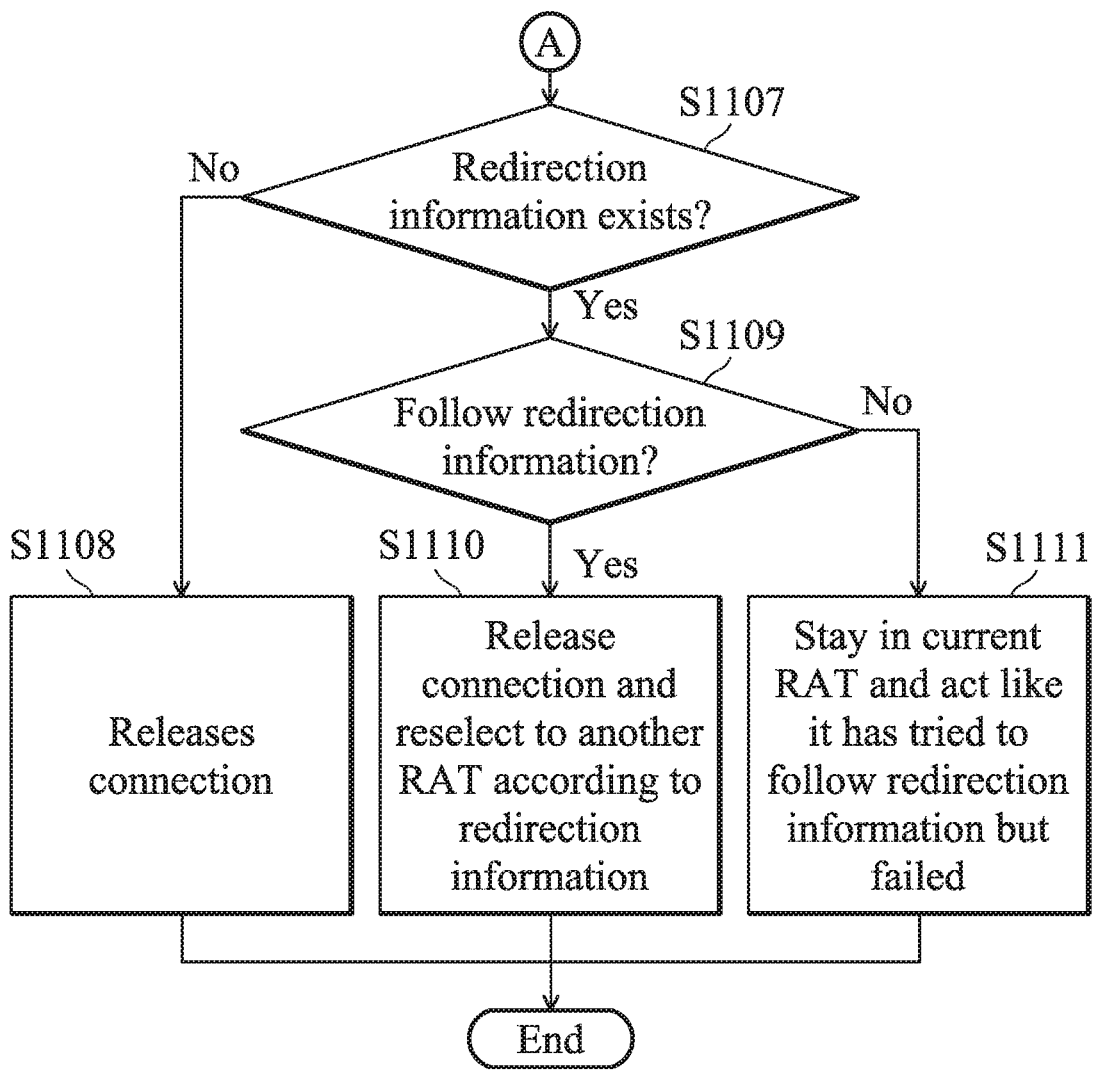

FIGS. 11A and 11B show a flow chart illustrating the method for synchronizing states of separate subscriber identities with network according to an embodiment of the application.

In this embodiment, the method for synchronizing states of separate subscriber identities with network is applied to and executed by a mobile communication device (e.g., the mobile communication device 110) including an RF device.

To begin with, it is first determined whether to apply alternative 1 or alternative 2 for the trigger condition of the method (step S1101). Specifically, alternative 1 refers to performing the method when a specific communication procedure associated with one subscriber identity is completed (e.g., a voice call procedure or a signaling procedure is completed, or a data service application, such as the YouTube APP, is suspended or terminated) (step S1102), while alternative 2 refers to performing the method when the communication procedure associated with one subscriber identity is interrupted by a communication procedure associated with another subscriber identity (step S1103).

Subsequent to steps S1102 and S1103, the mobile communication device determines whether an RRC connection associated with the specific communication procedure or the interrupted communication procedure exists (step S1104), and if not, the method ends.

Otherwise, if an RRC connection associated with the specific communication procedure or the interrupted communication procedure exists, the mobile communication device sends a measurement report to the serving cell of the service network, wherein the measurement report indicates that the (reported) signal quality of the serving cell is poor enough to release the current connection (step S1105). Specifically, the signal quality of the serving cell may be considered to be poor enough, if the reported signal quality is set to a value representing a worst signal quality or is set to another value less than a threshold preconfigured by network (e.g., the threshold preconfigured for event type A2 measurement report).

Next, the mobile communication device determines whether an RRC Connection Release message is received (step S1106), and if so, determines whether the RRC Connection Release message includes redirection information (step S1107).

Subsequent to step S1107, if the RRC Connection Release message does not include redirection information, the mobile communication device just releases the connection (step S1108), and the method ends.

Subsequent to step S1107, if the RRC Connection Release message includes redirection information, the mobile communication device determines whether or not to follow the redirection information (step S1109), and if so, releases the connection and reselects to a cell on another RAT according to the redirection information (step S1110), and the method ends. Otherwise, if the mobile communication device determines not to follow the redirection information, the mobile communication device stays in the current RAT and acts like it has tried to follow the redirection information but failed, by performing a TAU procedure on the serving cell (step S1111), and the method ends.

Subsequent to step S1106, if no RRC Connection Release message is received, the mobile communication device determines whether an RRC Connection Reconfiguration message is received instead (step S1112). If no RRC Connection Reconfiguration message is received, the method returns to step S1105. Otherwise, if an RRC Connection Reconfiguration message is received, the mobile communication device sends an RRC Connection Re-establishment Request message including a fake UE identity to the serving cell (step S1113), and then releases the connection when receiving an RRC Connection Re-establishment Reject message from the serving (step S1114), and the method ends.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
    a Radio Frequency (RF) device, configured to perform wireless transmission and reception to and from one or more cells; and
    a baseband processor, configured to use a first subscriber identity to establish a connection with a serving cell via the RF device to perform a first communication procedure, and in response to completing the first communication procedure or the first communication procedure being interrupted by a second communication procedure associated with a second subscriber identity, use the first subscriber identity to send a measurement report to the serving cell via the RF device, wherein the measurement report indicates a reported signal quality of the serving cell is poor enough to release the connection, and the measurement report is sent even when a measured signal quality of the serving cell is good enough to keep the connection.

2. The mobile communication device of claim 1, wherein the reported signal quality of the serving cell is set to a value representing a worst signal quality, or is set to another value less than a threshold preconfigured by a service network to which the serving cell belongs.

3. The mobile communication device of claim 1, wherein the measurement report comprises an event type that is set to A2 defined in Third Generation Partnership Project (3GPP) specifications.

4. The mobile communication device of claim 1, wherein the baseband processor is further configured to use the first subscriber identity to receive a Radio Resource Control (RRC) Connection Release message from the serving cell via the RF device, and release the connection in response to the RRC Connection Release message not comprising redirection information.

5. The mobile communication device of claim 1, wherein the baseband processor is further configured to use the first subscriber identity to receive an RRC Connection Release message from the serving cell via the RF device, and in response to the RRC Connection Release message comprising redirection information, release the connection and reselect to another cell according to the redirection information.

6. The mobile communication device of claim 1, wherein the baseband processor is further configured to use the first subscriber identity to receive an RRC Connection Release message from the serving cell via the RF device, and in response to the RRC Connection Release message comprising redirection information, release the connection, ignore the redirection information, and use the first subscriber identity to perform a Tracking Area Update (TAU) procedure on the serving cell via the RF device.

7. The mobile communication device of claim 1, wherein the baseband processor is further configured to use the first subscriber identity to receive an RRC Connection Reconfiguration message from the serving cell via the RF device, use the first subscriber identity to send an RRC Connection Re-establishment Request message comprising a fake UE identity that is different from the UE's real identity to the serving cell via the RF device in response to receiving the RRC Connection Reconfiguration message, and release the connection in response to receiving an RRC Connection Re-establishment Reject message from the serving cell via the RF device.

8. The mobile communication device of claim 1, wherein the baseband processor is further configured to determine whether the second communication procedure has a higher priority level than the first communication procedure, and allows the second communication procedure to interrupt the first communication procedure in response to determining that the second communication procedure has a higher priority level than the first communication procedure.

9. The mobile communication device of claim 1, wherein each of the first communication procedure and the second communication procedure is a voice call procedure, a signaling procedure, or a data service application.

10. A method for synchronizing states of separate subscriber identities with network, executed by a mobile communication device comprising a Radio Frequency (RF) device, the method comprising:
    using a first subscriber identity to establish a connection with a serving cell via the RF device to perform a first communication procedure; and in response to completing the first communication procedure or in response to the first communication procedure being interrupted by a second communication procedure associated with a second subscriber identity, using the first subscriber identity to send a measurement report to the serving cell via the RF device, wherein the measurement report indicates a reported signal quality of the serving cell is poor enough to release the connection, and the measurement report is sent even when a measured signal quality of the serving cell is good enough to keep the connection.

11. The method of claim 10, wherein the reported signal quality of the serving cell is set to a value representing a worst signal quality, or is set to another value less than a threshold preconfigured by a service network to which the serving cell belongs.

12. The method of claim 10, wherein the measurement report comprises an event type that is set to A2 defined in Third Generation Partnership Project (3GPP) specifications.

13. The method of claim 10, further comprising:
using the first subscriber identity to receive a Radio Resource Control (RRC) Connection Release message from the serving cell via the RF device; and
releasing the connection in response to the RRC Connection Release message not comprising redirection information.

14. The method of claim 10, further comprising:
using the first subscriber identity to receive an RRC Connection Release message from the serving cell via the RF device; and
in response to the RRC Connection Release message comprising redirection information, releasing the connection and reselecting to another cell according to the redirection information.

15. The method of claim 10, further comprising:
using the first subscriber identity to receive an RRC Connection Release message from the serving cell via the RF device; and
in response to the RRC Connection Release message comprising redirection information, releasing the connection, ignoring the redirection information, and using the first subscriber identity to perform a TAU procedure on the serving cell via the RF device.

16. The method of claim 10, further comprising:
using the first subscriber identity to receive an RRC Connection Reconfiguration message from the serving cell via the RF device;
using the first subscriber identity to send an RRC Connection Re-establishment Request message comprising a fake UE identity that is different from the UE's identity to the serving cell via the RF device in response to receiving the RRC Connection Reconfiguration message; and
releasing the connection in response to receiving an RRC Connection Re-establishment Reject message from the first serving cell via the RF device.

17. The method of claim 10, further comprising:
determining whether the second communication procedure has a higher priority level than the first communication procedure; and
allowing the second communication procedure to interrupt the first communication procedure in response to determining that the second communication procedure has a higher priority level than the first communication procedure.

18. The method of claim 10, wherein each of the first communication procedure and the second communication procedure is a voice call procedure, a signaling procedure, or a data service application.

* * * * *